UNITED STATES PATENT OFFICE 2,683,592

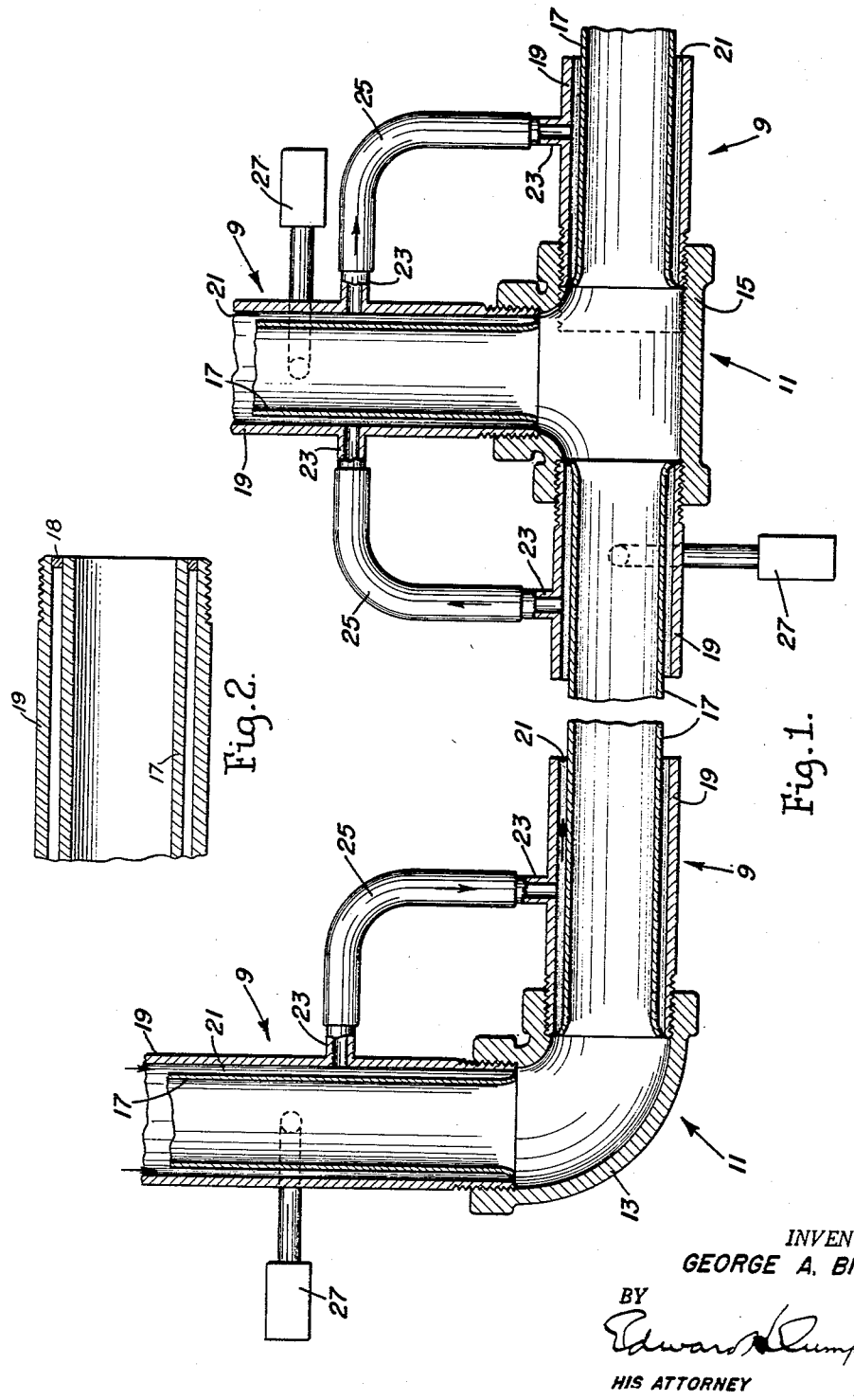

HEATED CONDUIT SYSTEM

George A. Birney, Le Roy, N. Y.

Application February 14, 1951, Serial No. 210,895

6 Claims. (Cl. 257—246)

This invention relates to conduit systems and more particularly to heated conduit systems for conducting normally viscous, slow flowing fluids such as asphalt, pitch, tar and the like, one object of the invention being to provide an improved conduit system having a simpler, more efficient and more economical heating system.

Another object is to provide a conduit system having the above advantages which does not require special heated fittings, but which is adapted for use with standard unheated or non-jacketed pipe fittings.

To these and other ends the invention resides in certain improvements and combinations of parts, all as will be hereafter more fully described, the novel features being pointed out in the claims at the end of the specification.

In the drawings:

Fig. 1 is a plan view showing the construction of a conduit system embodying the present invention, and Fig. 2 is a fragmentary sectional view showing a modified construction at the end of a pipe section.

In the past it has been common in constructing heated conduit systems to enclose both the pipe sections and the fittings connecting said sections together with a jacket for the reception of steam or other suitable fluid for heating the conduit system to maintain the desired temperature in the fluids flowing therethrough. However, these systems have not been entirely satisfactory for not only are the jacketed fittings very expensive, but the systems themselves are expensive to maintain and operate.

The present embodiment of the invention, herein disclosed by way of illustration, provides a means for heating a conduit system without requiring the use of expensive jacketed fittings and comprises, preferably, a pipe section shown generally at 9 and suitable fittings therefor shown generally at 11. It will be understood that although the drawing discloses only a 90° elbow 13 and a T 15, this is in an illustrative manner only and any reference in the specification or claims to "fitting" is meant to include all types of pipe fittings, such as elbows, T's, unions, crosses, valves, expansion joints, couplings, pumps and the like.

Pipe section 9 comprises an inner pipe 17 and an outer pipe 19 which has a larger diameter than the inner pipe. Inner and outer pipes 17 and 19 are substantially the same length and are connected together in sealing engagement at the ends thereof by welding an outwardly flaring portion of inner pipe 17 to the outer pipe, or by welding an annular member or ring 18 (Fig. 2) between the ends of said pipes, or by other known and suitable means. Pipes 17 and 19 when connected together as above form therebetween a chamber or jacket 21 which extends for substantially the full length of pipe section 9, as shown in Fig. 1.

Outer pipe 19 is preferably provided adjacent the ends thereof with transversely extending pipes or nipples 23 which are connected to a suitable steam supply comprising connecting pipes 25. Pipes 19 of adjacent pipe sections are, preferably, connected together as shown in Fig. 1 so that the steam or other fluid may pass through the heating chambers 21 of each pipe section thereby heating each pipe section for substantially the full length thereof. By way of illustration, the steam or other heating fluid is shown passing through heating chambers 21 in the direction of arrows in Fig. 1. It is to be understood that connecting pipes 25 may be provided with T's or other suitable fittings (not shown) for adding fresh steam to the heating system or for changing the direction of the steam flow. Outer pipe 19 is also provided with trap 27 of known and suitable construction for bleeding the heating system and for removing any condensate formed therein.

Pipe sections 9 are preferably connected together by regular, commercially available, non-jacketed fittings, as illustrated by elbow 13 and T 15, which as shown in Fig. 1, threadedly engage the ends of outer pipe 19. It is to be understood that although threaded connections are preferred between fittings 11 and outer pipe 19, other suitable methods of connection, such as welding and the like may be used.

As shown in Fig. 1, fittings 11 are brought into contact with the end portions of steam jacket 21 which extends substantially to the ends of pipe section 9 and thus extends inside said fittings. As a result, fittings 11 are sufficiently heated by contact with heating jacket 21 so that the asphalt or other materials flowing therethrough do not become chilled and too viscous for proper flow, as has been the case in the past when non-jacketed fittings have been used. It is apparent that the depth to which pipe section 9 is inserted into fittings 11 may be varied to suit particular installations as illustrated in Fig. 1 by the full and broken line positions of the right hand pipe section. The greater the depth, the greater the heat transfer to the fittings from pipe sections 9.

Thus it will be seen that the invention provides an improved and more economical conduit system which is heated for its entire length so that the materials flowing therethrough will be kept at their proper viscosity without, however, requiring the use of expensive jacketed, or otherwise separately heated, pipe fittings. In addition, the piping system that supplies the steam or other heating fluid is much simpler, has fewer connections and fittings therein, and as a result, the conduit system may be readily assembled or disassembled for cleaning, making alterations and the like, thereby greatly reducing the maintenance and operating costs.

It will thus be seen that the invention accomplishes its objects and while it has been herein disclosed by reference to the details of a preferred embodiment, it is to be understood that such disclosure is intended in an illustrative, rather than a limiting sense, as it is contemplated that various modifications in the construction and arrangement of the parts will readily occur to those skilled in the art, within the spirit of the invention and the scope of the appended claims.

I claim:

1. A heated conduit system comprising a pipe section and non-jacketed fittings attached to the opposite ends thereof, said pipe section comprising an outer pipe having a fluid inlet and fluid outlet spaced therealong, and an inner pipe having a smaller diameter than said outer pipe and being substantially the same length as said outer pipe, said inner pipe being connected to said outer pipe adjacent the ends thereof for forming therebetween a heating jacket extending substantially the full length of said pipe section, means for passing a heating fluid through said heating jacket for heating said inner pipe and the fluid therein for the full length of said pipe section, said fittings having a single wall and being attached to said pipe section in surrounding engagement with the end portions of said pipe section heating jacket for receiving heat from said heating jacket for heating said fittings to maintain the proper temperature of the fluids flowing therethrough.

2. A heated conduit system as specified in claim 1 in which said inner pipe is flared outwardly adjacent the ends thereof for connection to said outer pipe adjacent the respective ends thereof for forming the ends of said heating jacket.

3. A heated conduit system as specified in claim 1 in which an annular member is connected between said inner and outer pipes adjacent the respective ends thereof for forming the ends of said heating jacket.

4. A heated conduit system comprising a single walled, non-jacketed fitting having inlet and outlet connections, pipe sections threadedly engaging said inlet and outlet connections, each of said pipe sections comprising an outer pipe having a fluid inlet and a fluid outlet spaced therealong, and an inner pipe having a smaller diameter than said outer pipe and being substantially the same length as said outer pipe, said inner pipe being connected to said outer pipe adjacent the ends thereof for forming therebetween a heating jacket extending substantially the full length of said pipe section, and means for passing a heating fluid through the heating jackets of said pipe sections for heating said inner pipes and the fluids therein for the full length of said pipe sections, said heating jackets extending within said inlet and outlet connections of said fitting for transferring heat from said heating jackets to said fitting to maintain the proper temperature of the fluid flowing therethrough.

5. A heated conduit system as specified in claim 4 in which said inner pipe is flared outwardly adjacent the ends thereof for connection to said outer pipe adjacent the respective ends thereof for forming the ends of said heating jacket.

6. A heated conduit system as specified in claim 4 in which an annular member is connected between said inner and outer pipes adjacent the respective ends thereof for forming the ends of said heating jacket.

References Cited in the file of this patent

UNITED STATES PATENTS

| Number | Name | Date |
| --- | --- | --- |
| 70,365 | Russell | Oct. 29, 1867 |
| 270,193 | Rankin | Jan. 2, 1883 |
| 1,495,066 | Browne | May 20, 1924 |

FOREIGN PATENTS

| Number | Country | Date |
| --- | --- | --- |
| 20,193 | Great Britain | Sept. 27, 1915 |